US012611693B2

(12) United States Patent
Zhao et al.

(10) Patent No.: US 12,611,693 B2
(45) Date of Patent: Apr. 28, 2026

(54) APPARATUS AND METHOD FOR DISPENSING A MULTI-COMPONENT MATERIAL

(71) Applicant: GM GLOBAL TECHNOLOGY OPERATIONS LLC, Detroit, MI (US)

(72) Inventors: Selina X. Zhao, Rochester Hills, MI (US); Anthony M. Coppola, Rochester Hills, MI (US); Xiaosong Huang, Novi, MI (US); William Reginald Collin, Dearborn, MI (US); Robert H. Dietze, Brighton, MI (US); Christopher Brady, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 195 days.

(21) Appl. No.: 18/749,676

(22) Filed: Jun. 21, 2024

(65) Prior Publication Data

US 2025/0387798 A1     Dec. 25, 2025

(51) Int. Cl.
*B05C 5/02* (2006.01)
*B05C 11/10* (2006.01)
*G05D 11/13* (2006.01)

(52) U.S. Cl.
CPC ........ *B05C 5/0225* (2013.01); *B05C 11/1007* (2013.01); *G05D 11/135* (2013.01)

(58) Field of Classification Search
CPC .. B05C 5/0225; B05C 11/1007; G05D 11/135
See application file for complete search history.

(56) References Cited

U.S. PATENT DOCUMENTS

| | | | | |
|---|---|---|---|---|
| 2008/0061079 A1* | 3/2008 | Hedger | ................... | B29B 7/603 |
| | | | | 222/63 |
| 2012/0280870 A1* | 11/2012 | Maxwell | ................. | H01Q 1/38 |
| | | | | 343/745 |
| 2015/0224467 A1* | 8/2015 | Hirson | ..................... | F02C 1/05 |
| | | | | 204/164 |
| 2018/0207640 A1* | 7/2018 | Hayden | ............ | B01L 3/502707 |
| 2022/0250323 A1* | 8/2022 | Katon | ................... | B33Y 10/00 |
| 2025/0387798 A1* | 12/2025 | Zhao | .................... | B05C 5/0225 |

FOREIGN PATENT DOCUMENTS

| | | | | | |
|---|---|---|---|---|---|
| CA | 2614021 A1 * | 1/2007 | | ............ | G01F 15/08 |
| WO | 2023105449 A2 | 6/2023 | | | |
| WO | 2024124093 A1 | 6/2024 | | | |

* cited by examiner

*Primary Examiner* — Paul R Durand
*Assistant Examiner* — Bob Zadeh
(74) *Attorney, Agent, or Firm* — Quinn IP Law

(57) ABSTRACT

A method includes introducing a first material component having a first permittivity and a second material component having a second permittivity to a mixing unit. The first and second material components are advanced through the mixing unit at a mixing ratio to form a material component mixture that is dispensed from the mixing unit. A third permittivity of the material component mixture, which is related to the first permittivity, the second permittivity, and the mixing ratio, is determined. The third permittivity is compared to a predetermined permittivity, which is related to the first permittivity, the second permittivity, and a predetermined mixing ratio. If the third permittivity differs from the predetermined permittivity by a threshold limit or more than the threshold limit, a corrective response is generated.

20 Claims, 4 Drawing Sheets

12, 20, 24

50          52

APPARATUS AND METHOD FOR DISPENSING A MULTI-COMPONENT MATERIAL

INTRODUCTION

The disclosure generally relates to mixing multi-component materials that include a first material component and a second material component to form a material component mixture and dispensing of the material component mixture, such as, for example, as a structural adhesive, a thermal interface material, or the like.

Multi-component materials that are mixed together to form a material component mixture are used in many applications. For example, two-part adhesive systems may be mixed together at a mixing ratio and used as a structural adhesive to join various workpieces together, such as, for example, for incorporation into motor vehicles (electric motor vehicles (EVs), internal combustion engine (ICE) vehicles, or the like). Other applications include using a two-part polymeric system that is mixed together at a mixing ratio to form a thermal interface material for various applications, such as, for example, in battery module assemblies for incorporation into motor vehicles (e.g., EVs). Such two-part systems may cure or otherwise react together to form a structural bond and/or thermal interface layer with one or more workpieces. If such two-part systems are mixed together at a mixing ratio that deviates from a target or predetermined mixing ratio, the resulting material component mixture will have less than an ideal stoichiometry and, for example, when cured or otherwise reacted, may have a lower bond strength and/or lower mechanical or material properties, and/or result in lower production throughput, or the like.

SUMMARY

A method for dispensing a multi-component material in accordance with one or more embodiments is provided. The method includes introducing a first material component to a mixing unit. The first material component has a first permittivity when polarized under an electric field at a predetermined voltage frequency. The method further includes introducing a second material component to the mixing unit. The second material component has a second permittivity when polarized under the electric field at the predetermined voltage frequency. The second permittivity is different than the first permittivity. The method further includes advancing the first and second material components through the mixing unit at a mixing ratio to form a material component mixture that is dispensed from the mixing unit. A third permittivity of the material component mixture is determined when polarized under the electric field at the predetermined voltage frequency. The third permittivity is related to the first permittivity, the second permittivity, and the mixing ratio. The method further includes comparing the third permittivity to a predetermined permittivity. The predetermined permittivity is related to the first permittivity, the second permittivity, and a predetermined mixing ratio. If the third permittivity differs from the predetermined permittivity by a threshold limit or more than the threshold limit, a corrective response is generated.

In some embodiments, the material component mixture is a polymeric material mixture or a pre-polymeric material mixture. The method includes introducing the first material component including introducing a first pre-polymeric material to the mixing unit, and introducing the second material component including introducing a second pre-polymeric material to the mixing unit.

In some embodiments, the material component mixture is a structural adhesive or a thermal interface material (TIM).

In some embodiments, the predetermined voltage frequency includes a frequency of from about 103 to about 109 Hz.

In some embodiments, determining includes measuring one or more dielectric and/or permittivity properties of the material component mixture when polarized under the electric field at the predetermined voltage frequency with a dielectric sensor.

In some embodiments, the corrective response includes producing an alarm signal.

In some embodiments, the corrective response includes adjusting the mixing ratio towards the predetermined mixing ratio for further dispensing of the material component mixture.

In some embodiments, the mixing ratio is manually adjusted towards the predetermined mixing ratio.

In some embodiments, the mixing ratio is automatically adjusted towards the predetermined mixing ratio.

In some embodiments, the threshold limit is a value(s) that corresponds to the mixing ratio deviating from about ±5% to about ±15% of the predetermined mixing ratio.

An apparatus for dispensing a multi-component material in accordance with one or more embodiments is provided the apparatus includes a dispensing unit. The dispensing unit includes a first pump-metering unit configured for fluidly communicating a first material component having a first permittivity when polarized under an electric field at a predetermined voltage frequency. A second pump-metering unit is configured for fluidly communicating a second material component having a second permittivity when polarized under the electric field at the predetermined voltage frequency. The second permittivity is different than the first permittivity. The dispensing unit further includes a mixing unit in fluid communication with the first and second pump-metering units for receiving the first and second material components. The first pump-metering unit, the second pump-metering unit, and the mixing unit are cooperatively configured to advance the first and second material components through the mixing unit at a mixing ratio to form a material component mixture that is dispensed from the mixing unit. The apparatus further includes a dielectric sensor configured to measure one or more dielectric and/or permittivity properties of the material component mixture for determining a third permittivity of the material component mixture when polarized under the electric field at the predetermined voltage frequency. The third permittivity is related to the first permittivity, the second permittivity, and the mixing ratio. The apparatus is configured to compare the third permittivity to a predetermined permittivity. The predetermined permittivity is related to the first permittivity, the second permittivity, and a predetermined mixing ratio. If the third permittivity differs from the predetermined permittivity by a threshold limit or more than the threshold limit, a corrective response is generated.

In some embodiments, the mixing unit includes a mixing tube extending from a proximal tube end portion to a distal tube end portion and including a plurality of mixing features disposed therein. The mixing tube is configured to mix the first and second material components together to form the material component mixture when the first and second material components are advanced therethrough. A dispense tip is disposed adjacent to and extending from the distal tube end portion. The dispense tip is configured to dispense the material component mixture.

In some embodiments, the dielectric sensor is disposed adjacent to and/or in the distal tube end portion.

In some embodiments, the mixing tube has an outer tubular surface. The dielectric sensor is disposed about the outer tubular surface of the distal tube end portion.

In some embodiments, the mixing tube has a tubular wall. The dielectric sensor is disposed in the tubular wall of the distal tube end portion.

In some embodiments, the mixing tube has a tubular wall surrounding a channel and the dielectric sensor is disposed through the tubular wall extending into the channel.

In some embodiments, the dielectric sensor includes a housing having an outer surface that includes a threaded feature that is configured to removably engage the tubular wall of the mixing tube.

In some embodiments, the dielectric sensor includes a flexible housing that is formed of a polymeric material.

In some embodiments, the dielectric sensor includes a sensing region and a high wear resistant coating that is disposed over the sensing region.

A vehicle in accordance with one or more embodiments is provided. The vehicle includes a workpiece and a material component mixture or a derivative thereof disposed thereon. The material component mixture was dispensed onto the workpiece by the method in accordance with one or more embodiments of the present disclosure.

The above features and advantages and other features and advantages of the present disclosure are readily apparent from the following detailed description of the best modes for carrying out the disclosure when taken in connection with the accompanying drawings.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Unless specifically stated from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, the numerical values provided herein are modified by the term "about."

Figure 1:
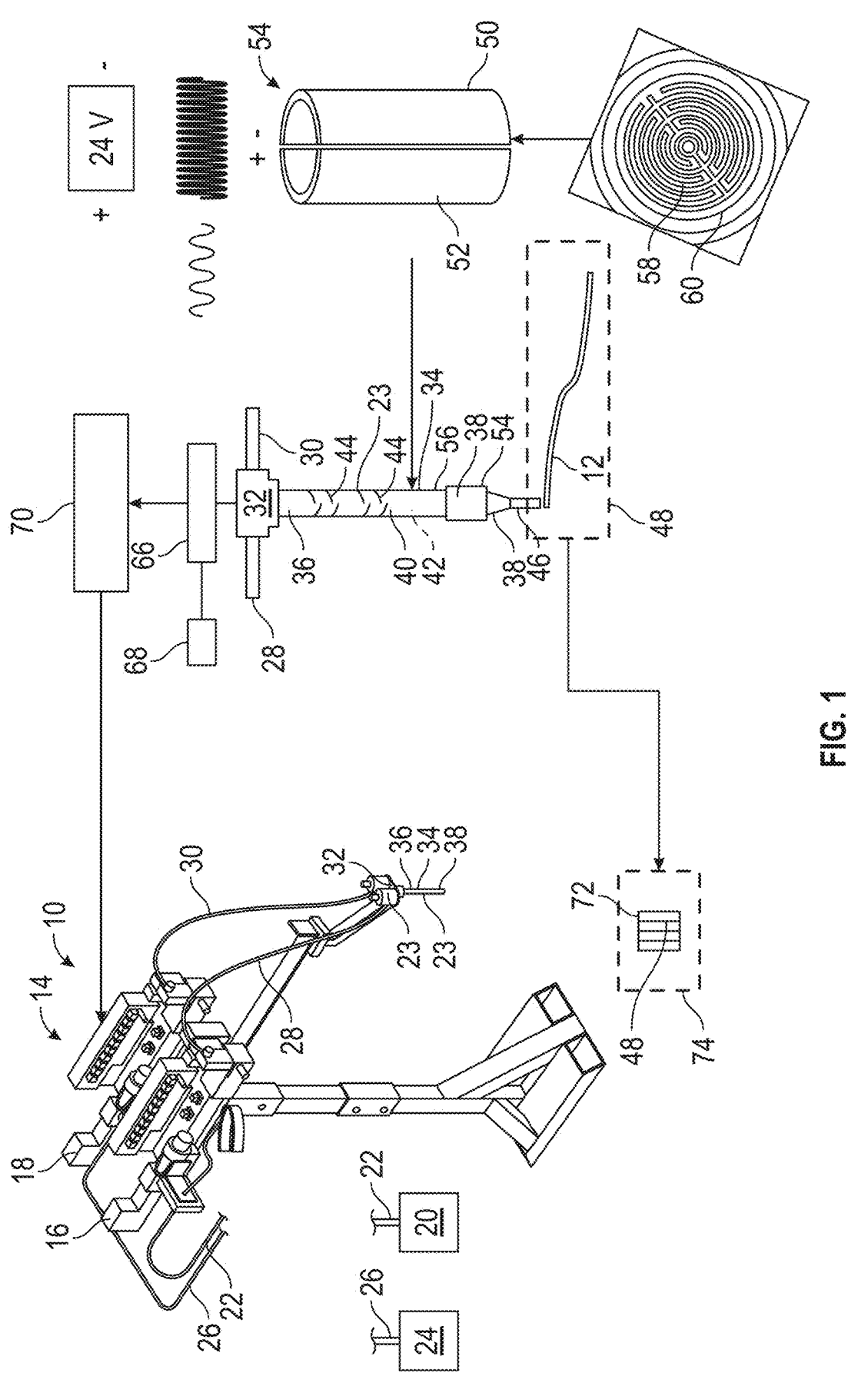
FIG. 1 illustrates a schematic view of an apparatus and method for dispensing a material component mixture in accordance with an exemplary embodiment.

FIG. 1 illustrates an exemplary apparatus 10 for dispensing a material component mixture 12 (i.e., multi-component material). The apparatus 10 includes a dispensing unit 14 that is configured for dispensing the material component mixture 12.

The dispensing unit 14 includes pump-metering units 16 and 18. As illustrated, the pump-metering unit 16 is in fluid communication with a material component 20 (e.g., first material component or part A) source via line 22. The pump-metering unit 16 is configured to advance the material component 20 towards a mixing unit 23 along line 28 for introduction to the mixing unit 23. Likewise, the pump-metering unit 18 is in fluid communication with the material component 24 (e.g., second material component or part B) source via line 26. The pump-metering unit 18 is configured to advance the material component 24 towards the mixing unit 23 along line 30.

As illustrated, the mixing unit 23 receives the material components 20 and 24 correspondingly on opposing sides of an upper portion 32 (e.g., head) of the mixing unit 23. In an exemplary embodiment, the pump-metering units 16 and 18 and the mixing unit 23 are cooperatively configured to advance the material components 20 and 24 through the mixing unit 23 at a mixing ratio where the mixing unit 23 mixes the material components 20 and 24 together to form the material component mixture 12 that is dispensed distally from the mixing unit 23.

In particular, the pump-metering unit 16 pumps via pressure a metered amount, or metered flow rate, of the material component 20 while the pump-metering unit 18 contemporaneously pumps via pressure a metered amount, or metered flow rate, of the material component 24 for introduction to the mixing unit 23. Under pressure, the metered amounts of the material components 20 and 24 are pushed or advanced through the mixing unit 23 at the mixing ratio, which is defined by the metered amounts of material components 20 and 24, while the mixing unit 23 is configured to mix the material components 20 and 24 together to form the material component mixture 12.

As illustrated, the metering unit 23 includes a mixing tube 34 extending distally downward from upper portion 32 of the mixing unit 23. In particular, the mixing tube 34 has a proximal tube end portion 36 that is adjacent to the upper portion 32 and extends downward to a distal tube end portion 38.

In an exemplary embodiment, the mixing tube 34 is configured as a static mixer. In particular, the mixing tube 34 has a tubular wall 40 surrounding a channel 42. Disposed within the channel 42 are a plurality of mixing features 44 (e.g., spiral features) that create a turbulent flow pattern for mixing the material components 20 and 24 together to form the material component mixture 12. A dispense tip 46 is disposed distally adjacent to and extending from the distal tube end portion 38. The dispense tip 46 is sized or otherwise configured to dispense the material component mixture 12, for example, onto a workpiece 48.

In an exemplary embodiment, the material component mixture 12 is a polymeric material mixture or a pre-polymeric material mixture (e.g., a curable polymeric material system) formed of first and second pre-polymeric materials, e.g., material components 20 and 24, respectively. The first and second pre-polymeric materials may cure or otherwise react when mixed together. Non-limiting examples of such polymeric material systems include polyurethane adhesives or resins (e.g., formed of a polyol material component and an isocyanate material component), epoxy adhesives or resins, polysiloxane adhesives or resins (formed of a propylene glycol material component and a siloxane material component), polyurea adhesives or resins, or the like. Further, one or both material components 20 and 24 may further contain other ingredients, such as, for example, fillers, additives, fibers, modifiers, or the like. In an exemplary embodiment, the polymeric material mixture 12 is a structural adhesive. In another embodiment, the polymeric material mixture 12 is a thermal interface material (TIM).

Figure 3:
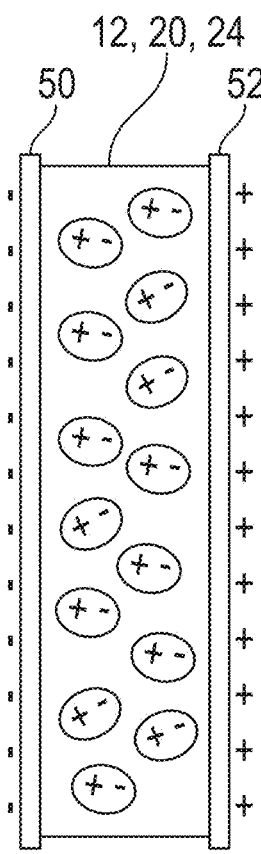
FIG. 3 illustrates, in cross sectional view, a material component mixture that is polarized under the electric field at the predetermined voltage frequency in accordance with the present disclosure.
Figure 4:
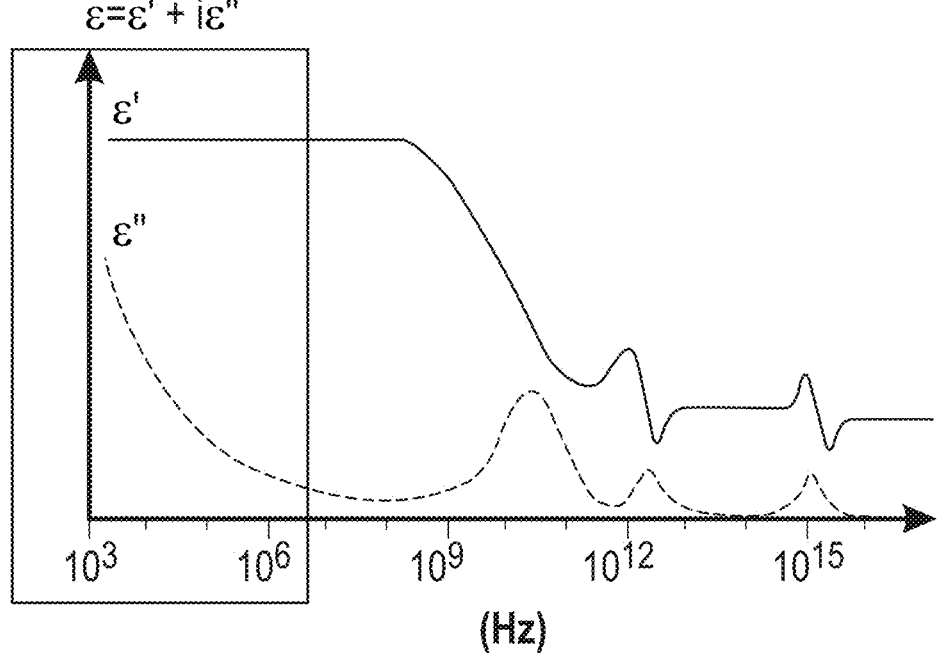
FIG. 4 is a graphical representation of the permittivity of the material component mixture depicted in FIG. 3.

In an exemplary embodiment, the polymeric or pre-polymeric materials/components 12, 20, 24 have a relatively low dielectric constant, such as, for example from about 2 to about 12. Referring also to FIGS. 3-4, the polymeric or pre-polymeric materials/components 12, 20, 24 have a corresponding permittivity ($\varepsilon$) when polarized under an electric field at a predetermined voltage and excitation frequency, for example, between the electrodes 50 and 52. In particular, for relatively low dielectric constant materials, it has been found that relatively small changes in the material composition (e.g., differences in mixing ratio) can be detected by determining the permittivity ($\varepsilon$) of the material(s) at a voltage frequency where there is a significant difference between the storage and loss permittivity components $\varepsilon'$ and $\varepsilon''$, respectively, wherein:

$$\varepsilon = \varepsilon' + i\varepsilon''.$$

As illustrated FIG. 4, in an exemplary embodiment, significant differences between the storage and loss permittivity components $\varepsilon'$ and $\varepsilon''$ are particularly prominent when the voltage frequency is from about $10^3$ to about $10^9$ Hz, for example from about 5 to about 10 KHz.

Referring back to FIG. 1, the apparatus 10 further includes a dielectric sensor 54. The dielectric sensor 54 is configured to measure one or more dielectric and/or permittivity properties of the material component mixture 12 for determining the corresponding permittivity of the material component mixture 12 when polarized under the electric field at the predetermined voltage frequency.

In an exemplary embodiment, the permittivity (first permittivity) of the material component 20 is different from the permittivity (second permittivity) of the material component 24. Further, the permittivity (third permittivity) of the material component mixture 12 is related to the first permittivity, the second permittivity, and the mixing ratio. In one embodiment, the third permittivity of the material component mixture 12 is related to the first permittivity and the second permittivity by the rule of mixtures, which correlates with the mixing ratio, wherein the relationship is defined as:

$$\varepsilon = (\Psi_1\varepsilon_1 + \Psi_2\varepsilon_2),$$

wherein $\Psi_1$ is the weight fraction of the material component 20 in the material component mixture 12, $\Psi_2$ is the weight fraction of the material component 24 in the material component mixture 12, $\varepsilon_1$ is the first permittivity, $\varepsilon_2$ is the second permittivity, and $\varepsilon$ is the third permittivity.

In an exemplary embodiment, the dielectric sensor 54 is in-line with the dispensing unit 14 and is disposed adjacent to and/or in the distal tube end portion 38. In particular, the material components 20 and 24 are progressively mixed as the material components 20 and 24 are advanced distally through the channel 42 from the proximal tube end portion 36, over and about the mixing features 44, to the distal tube end portion 38. At the distal tube end portion 38, the material components 20 and 24 are substantially completely mixed together to form the material component mixture 12. Thus, locating the dielectric sensor 54 about or near the distal tube end portion 38 ensures that the measurements generated by the dielectric sensor 54 correspond to the dielectric and/or permittivity properties of the material component mixture 12 and not a partially mixed form (e.g., non-homogeneous) of the material components 20 and 24.

As illustrated, the mixing tube 34 has an outer tubular surface 56 and the dielectric sensor 54 is disposed about the outer tubular surface 56 of the distal tube end portion 38. Alternatively, the dielectric sensor 54 may be disposed in the tubular wall 40 of the distal tube end portion 38 such that the dielectric sensor 54 is in direct contact with the material component mixture 12. The dielectric sensor 54 includes oppositely charged electrodes 50 and 52, for example supported by a rigid housing, and a sensing region 58 that is operatively disposed between the electrodes 50 and 52. In an exemplary embodiment, the electrodes 50 and 52 are spaced apart from each other from a distance of about 10 to about 15 mm. The sensing region 58 measures the one or more dielectric and/or permittivity properties of the material component mixture 12 when the material component mixture 12 is polarized under the electric field at the predetermined voltage frequency generated by the electrodes 50 and 52. In an exemplary embodiment, a high wear resistant coating 60 (e.g., nitride-based or other ceramic coating or the like) may be disposed overlying the sensing region 58. Advantageously, in an exemplary embodiment, the high wear resistant coating 60 protects the sensing region 58, for example, if the sensing region 58 would otherwise be in direct contact with the material component mixture 12, and/or for cleaning of the dielectric sensor 54, or the like.

Figure 2:
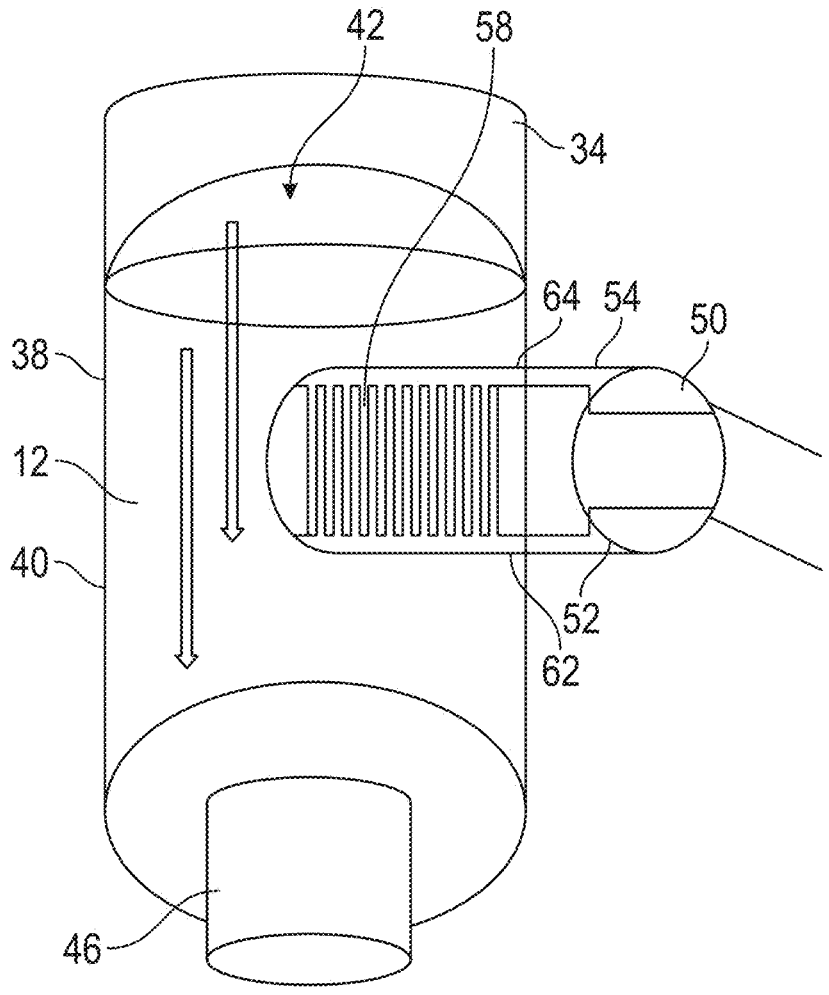
FIG. 2 illustrates a schematic view of a portion of an apparatus for dispensing a material component mixture in accordance with an exemplary embodiment.

Referring to FIG. 2, in another exemplary embodiment, the dielectric sensor 54 is disposed through the tubular wall 40 of the distal tube end portion 38 of the mixing tube 34 and extends into the channel 42. The dielectric sensor 54 includes a housing 62 having an outer surface 64 that includes threaded features that removably engage the tubular wall 40 of the mixing tube 34. Further, the housing 62 of the dielectric sensor 54 is flexible and formed of a polymeric material, such as, for example, polyimide, or other flexible polymeric material. Advantageously, the dielectric sensor 54 is reusable as it can be threaded into the mixing tube 34, which may be disposable, and removed from the mixing tube 34 for further use in other disposable mixing tubes 34. Additionally, inserting or positioning the dielectric sensor 54 transversely or substantially perpendicularly through the tubular wall 40 with the sensing region 58 disposed in the channel 42 where the flow profile of the material component mixture 12 is at or near its maximum, allows for a very rapid characterization and accuracy of the measurements for determining the permittivity of the material component mixture 12.

Referring to FIG. 1, the apparatus 10 is configured to compare the permittivity (e.g., third permittivity) of the material component mixture 12 to a predetermined permittivity. The predetermined permittivity is related to the permittivities of the material components 20 and 24 and a target or predetermined mixing ratio (stoichiometrically desired or ideal mixing ratio which is unique for each distinct reactive polymer system). The apparatus 10 includes a data acquisition system 66 that is in communication with the dielectric sensor 54 and that receives the data or measurements from the dielectric sensor 54 to determine the permittivity of the material component mixture 12.

Further, the data acquisition system 66 compares the permittivity of the material component mixture 12 to the predetermined permittivity. If the permittivity of the material component mixture 12 differs from the predetermined permittivity by a threshold limit or more than the threshold limit, a corrective response is generated. In an exemplary embodiment, the corrective response includes producing an alarm signal, for example, via an alarm 68 (e.g., audio alarm, light warning alarm, or the like). In another exemplary embodiment, a programmable logic controller (PLC) 70 is in communication with the data acquisition system 66 and the corrective action includes the PLC directing the pump-metering units 16 and 20 to automatically adjust the mixing ratio towards the predetermined mixing ratio for further dispensing of the material component mixture 12.

Alternatively, the dielectric sensor 54 may be off-line and distinct from the dispensing unit 14. In this embodiment, an operator may collect a sample of the material component mixture 12 from the dispensed tip 46 in a container that includes the dielectric sensor 54, or alternatively, transport used in various applications. For example, the material component mixture 12 may be cured or otherwise reacted to form a derivative or cured form of the material component mixture 12 for use as a thermal interface material, for example in battery assemblies 72 for incorporation into a vehicle 74. In another example, the material component 12 may be cured or otherwise reacted to form a derivative or cured form of the material component mixture 12 as a structural adhesive that bonds two or more workpieces 48 together for incorporation into vehicle 74.

The following examples are provided for illustration purposes and are not meant to limit the various embodiments of the apparatus 10 and the corresponding method.

Figure 5:
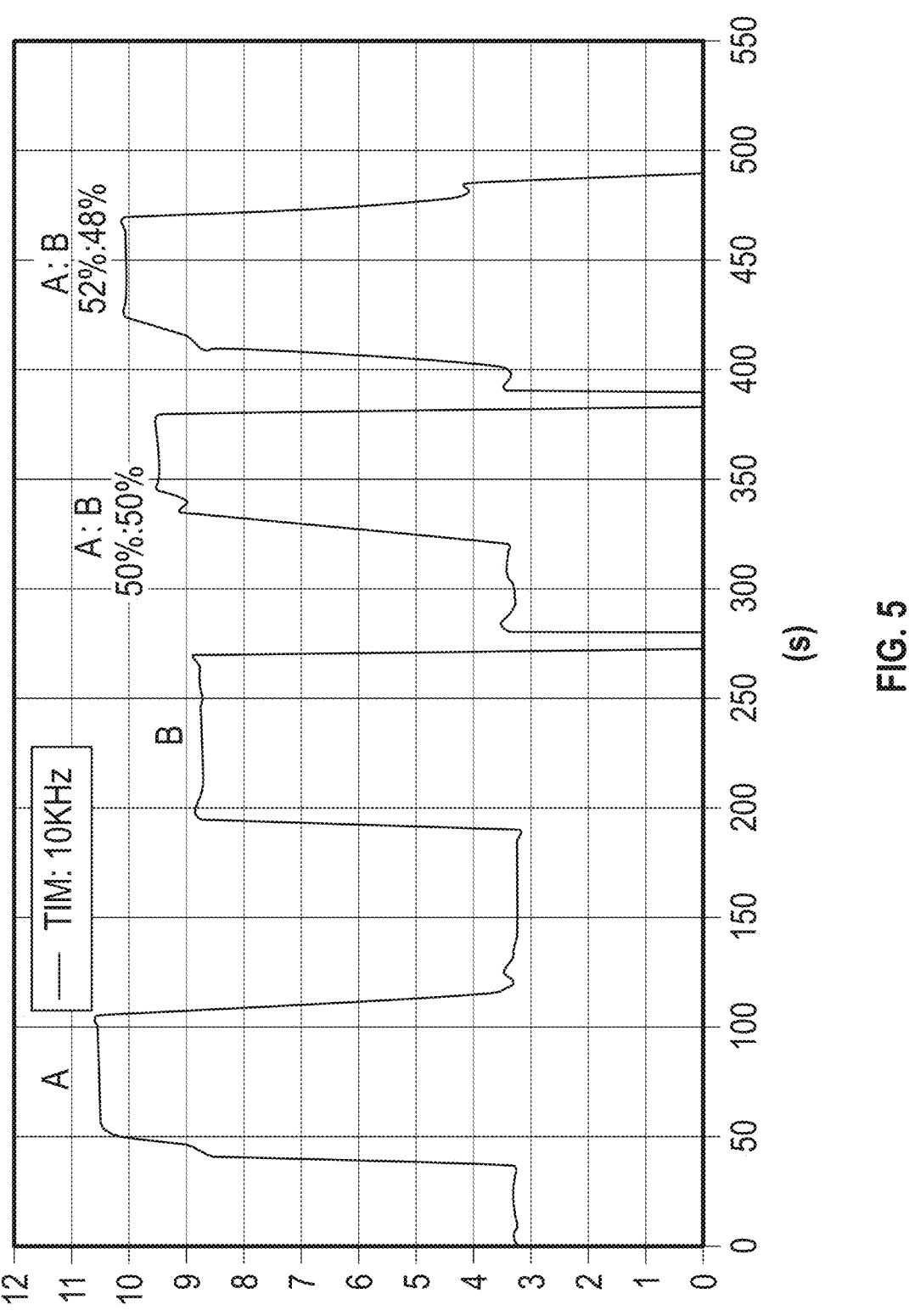
FIG. 5 is a graphical representation of the permittivity of individual material components and the resulting material component mixture at various mixing ratios in accordance with the present disclosure.

EXAMPLES—Permittivity measurements of various dispensing ratios at a voltage frequency of 10 kHz. Table 1 below includes 10 discrete measurements, the average value, and standard deviation of 100 wt. % of Part A (material component 20), 100 wt. % of Part B (material component 24), a 50/50 wt. % of Part A and Part B (material component mixture 12 at the target mixing ratio), 52/48 wt. % of Part A and Part B (material component mixture 12 at a lower threshold limit of the mixing ratio) and 47/53 wt. % of Part A and Part B (material component mixture 12 at an upper threshold limit of the mixing ratio). Referring to Table 1, the individual and averaged values including the standard deviations of the material component mixture 12 at the lower and upper threshold limits of the mixing ratio is significantly different than the individual and averaged values including the standard deviations of the material component mixture 12 at the target mixing ratio. These results are also consistent with those illustrated in FIG. 5 where the horizontal axis is Time in units of seconds and the vertical axis is permittivity. Thus, there are statistically significant differences to differentiate using the apparatus 10 and corresponding method disclosed herein using permittivity to monitor the mixing ratio for forming and dispensing a multicomponent.

TABLE 1

|  | Part A 100 wt. % | Part B 100 wt. % | Part A:Part B 50 wt. %:50 wt. % | Part A:Part B 52 wt. %:48 wt. % | Part A:Part B 47 wt. %:53 wt. % |
|---|---|---|---|---|---|
| 1 | 10.6668 | 8.769 | 9.229 | 9.901 | 9.08130804 |
| 2 | 11.454 | 8.787 | 8.93 | 9.913 | 9.4380606 |
| 3 | 11.205 | 8.809 | 8.926 | 9.94 | 9.3390128 |
| 4 | 10.395 | 8.579 | 9.438 | 9.958 | 8.8665688 |
| 5 | 10.403 | 8.727 | 9.464 | 9.977 | 8.9438368 |
| 6 | 10.566 | 8.703 | 9.077 | 9.941 | 9.0038934 |
| 7 | 10.782 | 8.576 | 9.436 | 9.973 | 9.0360508 |
| 8 | 10.56 | 8.692 | 9.391 | 9.848 | 8.9957624 |
| 9 | 10.622 | 8.724 | 9.498 | 9.886 | 9.0390964 |
| 10 | 10.58 | 8.771 | 8.717 | 9.925 | 9.0439562 |
| Avg. | 10.72338 | 8.7137 | 9.2106 | 9.9262 | 9.078754624 |
| Std. Dev. | 0.326 | 0.077 | 0.253 | 0.037 | 0.166483182 | the sample in the container to the dielectric sensor 54 that is located in another area. In this example, if the permittivity of the material component mixture 12 differs from the predetermined permittivity by the threshold limit or more than the threshold limit, the corrective response may include manually adjusting the pump-metering units 16 and 20 such that the mixing ratio is adjusted towards the predetermined mixing ratio for further dispensing of the material component mixture 12. In an exemplary embodiment, the threshold limit is a value(s) that corresponds to the mixing ratio deviating from about ±5% to about ±15%, for example about ±10%, of the predetermined mixing ratio.

In an exemplary embodiment, the workpiece 48 with the material component mixture 12 disposed thereon may be The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for dispensing a multi-component material, the method comprising:

introducing a first material component to a mixing unit, wherein the first material component has a first permittivity when polarized under an electric field at a predetermined voltage frequency;

introducing a second material component to the mixing unit, wherein the second material component has a second permittivity when polarized under the electric field at the predetermined voltage frequency, and wherein the second permittivity is different than the first permittivity;

advancing the first and second material components through the mixing unit at a mixing ratio to form a material component mixture that is dispensed from the mixing unit;

determining a third permittivity of the material component mixture when polarized under the electric field at the predetermined voltage frequency, wherein the third permittivity is related to the first permittivity, the second permittivity, and the mixing ratio; and comparing the third permittivity to a predetermined permittivity, wherein the predetermined permittivity is related to the first permittivity, the second permittivity, and a predetermined mixing ratio, and wherein if the third permittivity differs from the predetermined permittivity by a threshold limit or more than the threshold limit, a corrective response is generated.

2. The method of claim 1, wherein the material component mixture is a polymeric material mixture or a prepolymeric material mixture, wherein introducing the first material component comprises introducing a first pre-polymeric material to the mixing unit, and wherein introducing the second material component comprises introducing a second pre-polymeric material to the mixing unit.

3. The method of claim 2, wherein the material component mixture is a structural adhesive or a thermal interface material (TIM).

4. The method of claim 1, wherein the predetermined voltage frequency includes a frequency of from about $10^3$ to $10^9$ Hz.

5. The method of claim 1, wherein determining includes measuring one or more dielectric and/or permittivity properties of the material component mixture when polarized under the electric field at the predetermined voltage frequency with a dielectric sensor.

6. The method of claim 1, wherein the corrective response includes producing an alarm signal.

7. The method of claim 1, wherein the corrective response includes adjusting the mixing ratio towards the predetermined mixing ratio for further dispensing of the material component mixture.

8. The method of claim 7, wherein the mixing ratio is manually adjusted towards the predetermined mixing ratio.

9. The method of claim 7, wherein the mixing ratio is automatically adjusted towards the predetermined mixing ratio.

10. The method of claim 1, wherein the threshold limit is a value(s) that corresponds to the mixing ratio deviating from about 5% to 15% of the predetermined mixing ratio.

11. An apparatus for dispensing a multi-component material, the apparatus comprising:

a dispensing unit comprising:

a first pump-metering unit configured for fluidly communicating a first material component having a first permittivity when polarized under an electric field at a predetermined voltage frequency;

a second pump-metering unit configured for fluidly communicating a second material component having a second permittivity when polarized under the electric field at the predetermined voltage frequency, wherein the second permittivity is different than the first permittivity;

a mixing unit in fluid communication with the first and second pump-metering units for receiving the first and second material components, and wherein the first pump-metering unit, the second pump-metering unit, and the mixing unit are cooperatively configured to advance the first and second material components through the mixing unit at a mixing ratio to form a material component mixture that is dispensed from the mixing unit; and a dielectric sensor configured to measure one or more dielectric and/or permittivity properties of the material component mixture for determining a third permittivity of the material component mixture when polarized under the electric field at the predetermined voltage frequency, wherein the third permittivity is related to the first permittivity, the second permittivity, and the mixing ratio, wherein the apparatus is configured to compare the third permittivity to a predetermined permittivity, wherein the predetermined permittivity is related to the first permittivity, the second permittivity, and a predetermined mixing ratio, and wherein if the third permittivity differs from the predetermined permittivity by a threshold limit or more than the threshold limit, a corrective response is generated.

12. The apparatus of claim 11, wherein the mixing unit comprises:

a mixing tube extending from a proximal tube end portion to a distal tube end portion and including a plurality of mixing features disposed therein, wherein the mixing tube is configured to mix the first and second material components together to form the material component mixture when the first and second material components are advanced therethrough; and a dispense tip disposed adjacent to and extending from the distal tube end portion, wherein the dispense tip is configured to dispense the material component mixture.

13. The apparatus of claim 12, wherein the dielectric sensor is disposed adjacent to and/or in the distal tube end portion.

14. The apparatus of claim 12, wherein the mixing tube has an outer tubular surface, and wherein the dielectric sensor is disposed about the outer tubular surface of the distal tube end portion.

15. The apparatus of claim 12, wherein the mixing tube has a tubular wall, and wherein the dielectric sensor is disposed in the tubular wall of the distal tube end portion.

16. The apparatus of claim 12, wherein the mixing tube has a tubular wall surrounding a channel and the dielectric sensor is disposed through the tubular wall extending into the channel.

17. The apparatus of claim 16, wherein the dielectric sensor comprises a housing having an outer surface that includes a threaded feature that is configured to removably engage the tubular wall of the mixing tube.

18. The apparatus of claim 11, wherein the dielectric sensor comprises a flexible housing that is formed of a polymeric material.

19. The apparatus of claim 11, wherein the dielectric sensor comprises;

a sensing region; and a high wear resistant coating that is disposed over the sensing region.

20. A vehicle comprising:

a workpiece; and a material component mixture or a derivative thereof disposed thereon, wherein the material component mixture has been dispensed onto the workpiece by a method comprising:

introducing a first material component to a mixing unit, wherein the first material component has a first permittivity when polarized under an electric field at a predetermined voltage frequency;

introducing a second material component to the mixing unit, wherein the second material component has a second permittivity when polarized under the electric field at the predetermined voltage frequency, and wherein the second permittivity is different than the first permittivity;

advancing the first and second material components through the mixing unit at a mixing ratio to form a material component mixture that is dispensed from the mixing unit;

determining a third permittivity of the material component mixture when polarized under the electric field at the predetermined voltage frequency, wherein the third permittivity is related to the first permittivity, the second permittivity, and the mixing ratio; and comparing the third permittivity to a predetermined permittivity, wherein the predetermined permittivity is related to the first permittivity, the second permittivity, and a predetermined mixing ratio, and wherein if the third permittivity differs from the predetermined permittivity by a threshold limit or more than the threshold limit, a corrective response is generated.

* * * * *